Feb. 18, 1969     I. BROWNING     3,427,942
CAMERA APPARATUS AND FILM
Filed Aug. 30, 1965
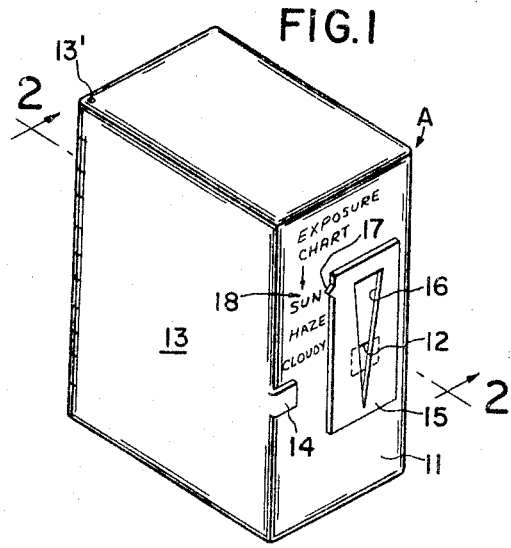
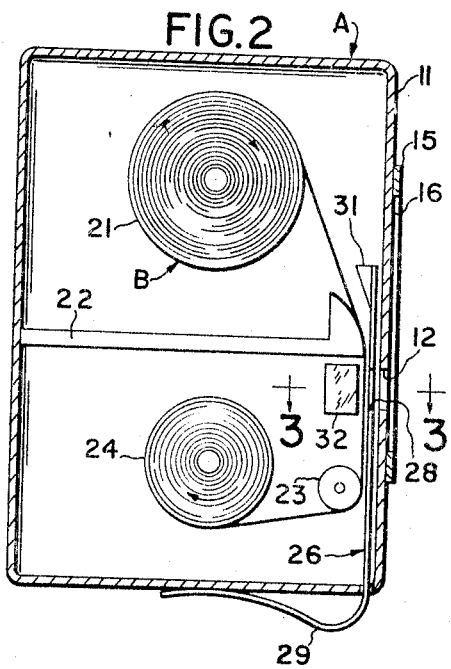
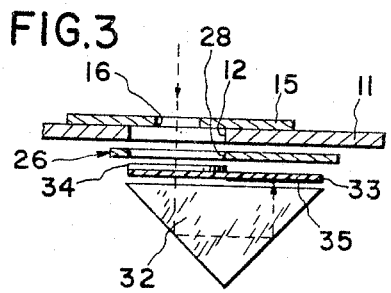
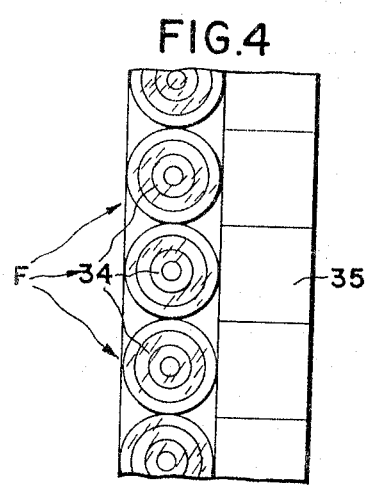
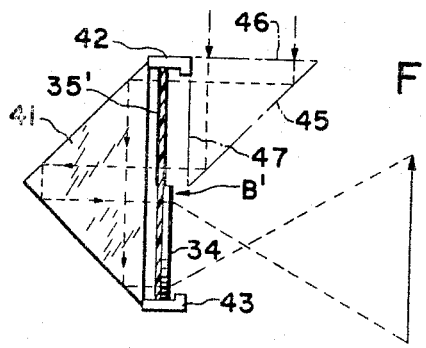
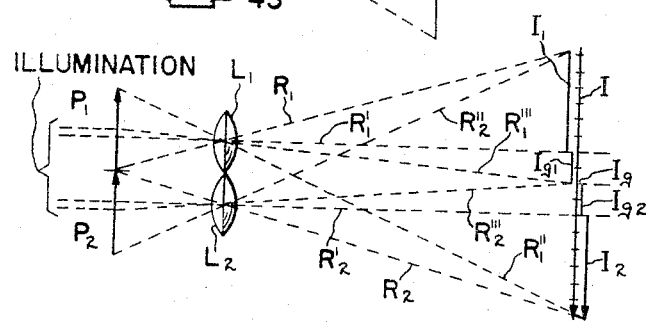
INVENTOR.
IBEN BROWNING
BY Townsend and Townsend
ATTORNEYS

United States Patent Office 3,427,942
Patented Feb. 18, 1969

3,427,942
CAMERA APPARATUS AND FILM
Iben Browning, 1176 Sesame Drive,
Sunnyvale, Calif. 94087
Filed Aug. 30, 1965, Ser. No. 483,515
U.S. Cl. 95—11    9 Claims
Int. Cl. G03b 19/18, 21/00, 21/20

ABSTRACT OF THE DISCLOSURE

A shutterless camera is described having a series of lenses positioned in side by side relation and moving with associated picture matrix areas for taking still or motion pictures without a shutter. The lenses can be in the form of Fresnel lenses positioned side by side on one half of the film for cooperating with a roof prism with picture frame areas arranged in side by side relation on the other half of the film. The film can include lenses having different focal lengths and the projector illumination for the recorded pictures can be slightly larger than a single or multiple number of frame areas.

---

The present invention relates in general to a camera and film therefor wherein the objective lens is incorporated in the photographic film.

One of the difficulties with conventional cameras is the necessity for a timed shutter for exposing the film with the desired amount of light and in the case of motion picture cameras, a mechanism for sequentially operating this shutter for one exposure of each frame on the film.

Broadly stated, the present invention, to be described in greater detail below, is directed to a camera apparatus and film therefor wherein the lens for the camera is formed on a portion of the transparent film base such as, for example, by press forming a Fresnel lens into the film base; a photographic emulsion is positioned on a portion of the film surface adjacent the film lens; and means such as, for example, a prism is located behind the film within the camera for directing the image formed by the film lens onto the emulsion. The film, including the lens as a part thereof, is moved past the aperture for exposure of the emulsion with an image formed on the emulsion by the lens.

Since in accordance with this invention the photographic emulsion and the lens move as a unit, the optical axis of these two elements remains, during the film movement, pointed in substantially the same direction so that the image effectively remains stationary relative to the film. Therefore, the speed of the film past the aperture and the size of the aperture determine the light exposure of the emulsion so that a timed shutter is not required.

Thus in accordance with the present invention, still pictures or pictures of fixed objects as, for example, buildings, printed text and the like can be taken on a single frame or a series of frames. Similarly, slowly moving objects can be photographed by a series of frames to bring out the motion of the object over the series.

The present invention can be utilized to produce images which are quite distinct when the distance moved by the optical axis of the camera in taking the picture is small compared to the size of the object. Thus the camera employs a short focal length.

In accordance with another aspect of the present invention, a series of lenses having slightly different focal lengths can be provided on the film to produce a series of pictures of the same object but with varying definition due to the variation in focal length.

By utilization of the present invention, the camera which employs the film having the lens and emulsion thereon can be of simple construction since an objective lens and timed shutter are not required. Thus the film can be packaged and sold in a very inexpensive container which can be returned with the film for processing. Due to the simplicity of the camera case, the case can be discarded after use if desired or can again be utilized to repackage another roll of unexposed film. A camera constructed in accordance with one specific embodiment of the present invention includes a simple winding mechanism for driving an entire roll of film past the lens aperture and a film stop strip that permits simultaneous stoppage of the film and closure of the lens aperture.

The present invention is readily adapted for use in a miniaturized camera which can be stored in a minimum amount of space, is easily operated by simply initiating movement of the film and is sufficiently silent so as not to attract attention since the only movement involved is the movement of the film.

Other objects and advantages of this invention will become apparent when reading the following description and referring to the accompanying drawings in which similar characters of reference represent corresponding parts in each of the several views.

In the drawings:

FIG. 1 is a perspective view of a camera structure in accordance with the present invention;

FIG. 2 is a side elevational view partially broken away of the structure shown in FIG. 1;

FIG. 3 is an enlarged cross sectional view of a portion of the structure shown in FIG. 2 taken along line 3—3 in the direction of the arrows;

FIG. 4 is a plan view of a film strip incorporating features of the present invention;

FIG. 5 is a schematic cross sectional view illustrating projection of pictures taken in accordance with the present invention; and FIG. 6 is a schematic ray tracing diagram illustrating operation of the present invention.

Referring now to the drawing, there is shown a camera A utilized for taking pictures with film B in accordance with the present invention, and wherein the film includes a lens C formed on a portion of the film for directing an image onto a sensitized portion D of the film B. While for purposes of illustration the invention will be described with specific reference to a camera wherein the sensitized material is a photographic emulsion, it will be appreciated that other types of sensitized materials can be utilized with corresponding associated elements for effectuating production of the image from the lens on the sensitized material, as known in the graphic arts.

Referring specifically to FIG. 1, the camera includes a housing 11 provided with an aperture 12 in one surface thereof for admitting light into the housing 11 for focusing by the lens C onto the sensitized material D as will be described in greater detail below. One side 13 of the housing 11 is provided with means such as a hinge 13′ and a latch 14 for opening and closing the housing 11 for loading and unloading the housing with the film B. An exposure control member 15 is provided adjacent the aperture 12 for controlling the size of the aperture 12. As illustrated by way of example, the control member 15 is in the form of a rectangular strip slidably mounted on the face of the camera in front of the aperture 12 and provided with a wedge-shaped slot 16 partially overlying the aperture 12 and extending therebeyond. By sliding the member 15, the area of the slot 16 in front of aperture 12 can be changed, and member 15 is provided with an indicating marker 17 cooperating with an exposure guide 18 printed on the face of the camera.

As illustrated in FIG. 2, the film B is mounted within the housing 11 on a supply reel 21 on one side of a partition 22 and is directed past the aperture 12 over a governor 23 onto a film take-up reel 24. Typically, the take-up reel 24 includes a spring (not shown) which can be wound to take up the entire roll of film B from supply reel 21. The governor 23 controls the speed at which the film is moved past the aperture 12 and with the exposure member 15 controls the exposure of the film.

A movable strip film stop 26 is provided inside the housing 11 for opening the camera aperture 12 to the lens portion of the film B and includes a central strip portion 27 provided with an aperture 28 movable into coincidence with the camera aperture 12. One end of the film stop 26 extends outwardly through the base of the housing 11 and is connected to the housing via a spring member 29 while the other end of the film stop is provided with an enlarged portion 31, wedge-shaped in cross-section located within the camera above the partition 22.

The action of spring 29 urges the film stop 26 downwardly with reference to the structure illustrated in FIG. 2 so that the aperture 28 is out of coincidence with aperture 12 and the enlarged portion 31 wedges the film B against the partition 22 to prevent movement of the film. By pressing the spring 29 upwardly into the position shown in FIG. 2 aperture 28 permits exposure of the film through aperture 12 and releases the film B for controlled movement by the governor 23 from the supply reel onto the take-up reel 24.

As can be seen from the above, the construction of the housing 11 is very simple and can be fabricated cheaply out of plastic so that the housing can be discarded as desired after the film has been exposed and then removed for developing.

Located within the housing 11 on the opposite side of the film B from aperture 12 is a roof prism 32 located with its roof apex aligned with the direction of movement of the film and with its broad surface extending from one edge of the film to the other as illustrated in FIG. 3.

The film is made up of a transparent film base 33 such as, for example, cellulose acetate, and includes on the obverse surface a series of lenses 34 formed thereon such as by being pressed into the film base 33. In order that this lens be sufficiently large to image a reasonably sized picture as described below, it is typically in the form of a Fresnel lens. The Fresnel lenses 34 are arranged along one edge of the film and occupy one-half of the width of the film base 33. This series of lenses 34 divides the film base 33 into a plurality of congruent transverse frame sections F. The half of the film 33 in each frame section F not occupied by the lens 34 is provided with a photographic emulsion 35 on the reverse surface of the film. With the roof of the prism 32 aligned parallel with the longitudinal centerline of the film 33 light is caused to reflect off the interior surfaces of the roof prism 32 for formation of an image on the photographic emulsion 35. It will be appreciated that the apertures 12 and 28 are located in the housing 11 and therefore, if the thickness of the housing 11 is substantially the same as the width of the film B, these apertures 12 and 28 are offset from the centerline on the front surface of the housing 11.

When a picture is taken by depressing the spring 29 to cause the film to move past the aperture 12, the lens 34 and its associated emulsion 35 move together so that there is no relative movement between the two and a well defined image of the object viewed through aperture 12 is formed on the emulsion 35 so long as the movement of the lens and film is small compared with the overall size of the object being viewed through the lens 34. Exposed film is removed from the housing 11, developed and can be projected utilizing the film lenses C as the projecting lens.

A projection of the developed film is shown in FIG. 5. As illustrated, in a projector P for the projection of the photographed images, a roof prism 41 substantially identical to prism 32 is provided with forwardly projecting sides 42 and 43 for guiding the developed film B' therepast. With parallel light directed through the developed emulsion 35', reflected interiorly of the prism 41 and passed forwardly through the lens 34 an image will be projected on the screen schematically illustrated as S.

As another embodiment of the present invention, the parallel light directed through the developed emulsion 35' on the film base 33 is formed by a diagonal mirror 45 illustrated in phantom and possibly provided with a condenser lens on one or both of its surfaces 46 and 47 through which light is passed.

When the developed film B' still including the lenses 34 thereon is illuminated with a field of light substantially equal to the size of one picture appearing on the emulsion half of one frame, the pictures can be projected through their matched lenses to display the image of a still or moving object, and a continuous image is projected without substantial interruption and without necessitating a time actuated shutter. This projection is schematically illustrated in the ray tracing diagram FIG. 6.

As illustrated in FIG. 6 with a field of light substantially equal to one picture but overlying portions of two pictures designated $P_1$ and $P_2$ with associated lenses designated $L_1$ and $L_2$, a single image I is projected. This image I includes an image portion $I_1$ formed by light between rays $R_1$ and $R_1'$ with the remaining portion of picture $P_1$ which would be formed by light between rays $R_1'$ and $R_1''$ not projected due to the limited field of illuminated light. The other image portion $I_2$ of the projected image I is made up of the light rays existing between rays $R_2$ and $R_2'$ with the light between rays $R_2'$ and $R_2''$ being excluded due to the limited field of light.

When the field of light is made equal to one picture, an image gap designated $I_g$ will exist between the projected image portions $I_1$ and $I_2$ due to the finite distance between lenses $L_1$ and $L_2$. However, by providing an illuminated picture slightly larger than a single frame, light is passed between rays designated $R_1'$ and $R_1'''$ serving to form one-half of the image gap $I_g$ and designated $I_g'$. The other half of the image gap $I_g$ which is designated $I_{g2}$ is formed from light between rays $R_2'$ and $R_2'''$ thereby serving to produce one continuous image I from two separate distinct pictures.

It will be appreciated that due to the movement of the optical axis of the lens and emulsion with respect to the object a certain lack of definition will result in the image photographed. However, so long as the distance moved by the optical axis is small, relative to the size of the object, or stated another way, if the focal length of the lens is short, the lack of definition will be minimal.

In accordance with another aspect of the present invention in order to produce definite images of a particular scene having objects at different distances from the camera, a series of lenses each having a different focal length can be provided on the film to produce the desired resolution to the various aspects of the picture being taken.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A photographic film comprising, in combination, a transparent strip film base; said film base divided transversely along its length into a plurality of frame sections; a plurality of Fresnel lenses formed in side by side relation into said film base and integral therewith, one of said lenses located in each of said frame sections and occupying substantially half of such frame section; and a photographic emulsion covering the other half of each of said frame sections for receiving an image passed through the Fresnel lens adjacent thereto in the same frame section and redirected onto said other half of such frame section of said film base.

2. A camera comprising, in combination, a transparent strip film base divided into a plurality of congruent transverse frame sections along the length thereof; a plurality of substantially identical Fresnel lenses formed in said film base in a row along one edge thereof, one of said lens being formed in each of said frame sections and occupying substantially half of such frame section; a photographic film emulsion on the other half of each of said transverse frame sections adjacent the Fresnel lens formed therein; a camera housing having a lens aperture the size of each of said Fresnel lenses; film drive means located within said housing for driving said film past said lens aperture without direct exposure of said other half of said frame sections provided with said photographic emulsion; and means for directing the image formed by each of said Fresnel lenses upon passing said lens aperture onto said emulsion for producing a photograph.

3. The apparatus in accordance with claim 2 characterized further in that said directing means includes a roof prism located within said housing behind said lens aperture for directing the image formed by each of said Fresnel lenses onto the photographic emulsion on the adjacent half frame, said prism having a broad surface coextensive with said transverse frame sections as said film is moved therepast and a roof edge aligned parallel with the direction of motion of said film past said lens aperture.

4. A photographic film comprising, in combination, a transparent strip film base; said film base divided transversely along its length into a plurality of frame sections; a plurality of Fresnel lenses formed into said film base and integral therewith, one of said lenses located in each of said frame sections occupying substantially half of such frame section; and a photographic emulsion covering the other half of each of said frame sections for receiving an image passed through the Fresnel lens adjacent thereto in the same frame section and redirected onto said other half of such frame section of said film base, said Fresnel lenses including a series of lenses having different focal lengths for bringing out different details of the picture being taken.

5. A camera comprising, in combination, a housing, an object aperture in said housing, a supply reel for supplying film, a take-up reel for moving the film from said supply reel past said object aperture, a partition dividing said housing between said supply and take-up reels, a film coiled on said supply reel and carried past said aperture to said take-up reel including a transparent strip film base divided into a plurality of congruent transverse frame sections along the length thereof, a plurality of substantially identical Fresnel lenses formed in said film base in a row along one edge thereof, one of said lenses formed in each of said frame sections and occupying substantially half of such frame section, and a photographic film emulsion on the other half of each of said transverse frame sections adjacent the Fresnel lenses formed therein; a film drive means located for driving said film from said supply reel to said take-up reel past said lens aperture without direct exposure of said other half of said frame sections provided with said photographic emulsion; a strip film stop mounted in said housing between said film and said object aperture for stopping said film and including a central portion provided with a stop aperture movable into coincidence with said object aperture, a wedge shaped portion on one end of said stop movable into engagement with said partition within said housing for stopping said film located therebetween and the other end of said stop extending through said housing and operable for movement of said wedge shaped portion and said stop aperture for releasing and permitting exposure of said film; and means for directing the image formed by each of said Fresnel lenses onto said emulsion for producing a photograph including a roof prism located within said housing on the opposite side of said film from said object aperture, said prism having a broad surface coextensive with said transverse frame sections as said film is moved therepast and a roof edge aligned parallel with the direction of motion of said film past said object aperture.

6. An optical device comprising in combination: a housing having an aperture therein; a lens matrix formed of a series of individual lenses disposed in side-by-side relationship; a picture matrix having a series of picture defining frame areas, each of said picture frame areas associated with a certain one of said lenses of said lens matrix; means for providing movement of said lens matrix and said picture matrix together relative to said aperture to move successively individual lenses of said lens matrix past said aperture; and means for illuminating a portion of said picture matrix slightly larger than a single or a multiple number of picture frame areas.

7. A photographic film including a transparent film base; a plurality of Fresnel lenses formed in a series on a portion of said film base with adjacent lenses of the series located immediately adjacent one another in side by side relationship; and a photographic emulsion on another portion of said film base and positioned for receiving an image passed through said lenses and said base and then redirected back onto said base.

8. A camera comprising, in combination, a transparent film base; a plurality of Fresnel lenses formed in a series on a portion of said film base with adjacent lenses of the series located immediately adjacent one another in side by side relationship; a photographic emulsion located on another portion of said film base adjacent said lenses; a camera housing having a lens aperture corresponding in size to said lenses; means for driving the lens portion of said film base within said housing past said lens aperture without direct exposure of said other portion of said film base; and means within said housing for directing onto said emulsion the image formed by said lenses when passing said lens aperture.

9. A photographic film including a transparent film base; a plurality of lenses formed in a series on a portion of said film base with adjacent lenses of the series located immediately adjacent one another in side by side relationship; a sensitized material on another portion of said film base and positioned for receiving an image passed through said lenses and said base and then redirected back onto said base.

References Cited

UNITED STATES PATENTS

| | | | |
|---|---|---|---|
| 2,015,722 | 10/1935 | Moreno | 352—198 X |
| 2,881,686 | 4/1959 | Ruhle. | |
| 3,245,750 | 4/1966 | Miller | 352—232 X |

JOHN M. HORAN, *Primary Examiner.*

U.S. Cl. X.R.

352—198, 232